(12) United States Patent
Kumagai et al.

(10) Patent No.: US 6,573,981 B2
(45) Date of Patent: *Jun. 3, 2003

(54) ELECTRONIC LEVEL

(75) Inventors: Kaoru Kumagai, Tokyo-to (JP); Fumio Ohtomo, Tokyo-to (JP)

(73) Assignee: Kabushiki Kaisha TOPCON, Tokyo-To (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/510,695

(22) Filed: Feb. 22, 2000

(65) Prior Publication Data
US 2002/0149764 A1 Oct. 17, 2002

(30) Foreign Application Priority Data
Mar. 17, 1999 (JP) .............................. 11-071535

(51) Int. Cl.$^7$ ................ G01C 3/08; G01C 5/02
(52) U.S. Cl. ................ 356/4.08; 33/293; 33/291
(58) Field of Search ................ 356/4.08; 33/293, 33/291

(56) References Cited

U.S. PATENT DOCUMENTS

| | | | | |
|---|---|---|---|---|
| 3,727,219 A | * | 4/1973 | Graham | |
| 4,023,908 A | * | 5/1977 | Johnson | |
| 4,715,714 A | | 12/1987 | Gaechter et al. | 356/375 |
| 5,537,200 A | * | 7/1996 | Kumagai et al. | 356/4.08 |
| 5,777,899 A | * | 7/1998 | Kumagai | 356/4.08 |
| 6,167,629 B1 | * | 1/2001 | Chiba | 356/4.08 |

* cited by examiner

Primary Examiner—Stephen C. Buczinski
(74) Attorney, Agent, or Firm—Nields & Lemack

(57) ABSTRACT

An electronic level for converting a pattern on a leveling rod to be collimated by photoelectric conversion and for determining difference of elevation, wherein there is provided an irradiation device for irradiating auxiliary survey light to be projected to the leveling rod by pulsed irradiation.

4 Claims, 4 Drawing Sheets $\theta$: PHASE OBTAINED BY FFT

R(0)R(1) -------
A(0)A(1) ———
B(0)B(1) — — —

ELECTRONIC LEVEL

BACKGROUND OF THE INVENTION

The present invention relates to an electronic level, and in particular, to an electronic level, which converts a pattern image on a leveling rod to an electric signal by a photoelectric converter and obtains difference of elevation from the electric signal.

A level is a survey instrument for measuring difference of elevation, and it is conventionally a survey instrument for collimating the leveling rod at a survey target point by an operator with a telescope and for visually reading numerical value given on the leveling rod. The electronic level as disclosed in the present invention is a device, which collimates the leveling rod, receives a pattern formed on a photodetection element, calculates the position by converting it to an electric signal, and displays it as a numerical value.

First, description will be given on a measurement principle of an electronic level.

On a leveling rod 1 for an electronic level to be used in association with an electronic level, a first pattern A, a second pattern B, and a third pattern R are repeatedly disposed with equal spacing (p) as shown in FIG. 4. That is, blocks are consecutively disposed, each block having three types of patterns. If the block arranged at the lowest position is defined as 0 block and the patterns are described as R (0), A (0) and B (0), the blocks are repeatedly arranged as R (1), A (1), B (1), R (2), A (2), B (2), . . . . Because all patterns are repeatedly disposed with equal spacing, a signal corresponding to the spacing can be referred to as a reference signal.

For example, the third pattern R has a fixed width with black portion width of 8 mm. In the first pattern A, width of black portion is modulated with maximum modulation width in the range of 10 mm so that 600 mm will be one cycle. In the second pattern B, width of the black portion is modulated with maximum modulation width in the range of 10 mm so that 570 mm will be one cycle.

As described above, in the first pattern A of the leveling rod 1, width of the black portion is modulated so that 600 mm will be one cycle. In the second pattern B of the leveling rod 1, width of the black portion is modulated so that 570 mm will be one cycle. Therefore, the cycle is slightly different between the first pattern A and the second pattern B. At a distance where the least common multiple of the two is reached, similar patterns repeatedly appear. In the above example, similar patterns repeatedly appear at 11400 mm, which is the least common multiple of 600 mm and 570 mm. Accordingly, the phase difference between the signal from the first pattern A and the signal from the second pattern B varies between 0 and $2\pi$ in the range of 0 to 11400 mm.

Now, a measurement principle of level height will be described.

First, description will be given on a case of long distance measurement.

When the leveling rod 1 is collimated in an electronic level, a pattern image of the leveling rod 1 is received by a linear sensor. As shown in FIG. 5, a signal from the photodetection element obtained from the linear sensor is processed by Fourier transform, and only the reference signal is picked up and processed by Fourier transform. From the signal processed by Fourier transform, a signal corresponding to the equal spacing pitch p can be obtained.

If it is supposed that the phase of the reference signal corresponding to the equal spacing pitch obtained by fast Fourier transform is $\theta$, and the phase of address position (m-th bit) of the linear sensor corresponding to the horizontal position H1 is $\theta$ m, it is expressed as follows:

$$H1=(\theta m/360°) \times p \quad (1)$$

That is, the horizontal position H1 can be precisely measured within the equal spacing pitch p (precise measurement).

In order to obtain the horizontal position, it is necessary to obtain the approximate position from the pattern-starting position of the equal spacing pitch p formed on the leveling rod 1. Here, the output signal from the linear sensor is integrated with respect to half-pitch before and after the reference signal (signal corresponding to the equal spacing pitch p). Further, the integration value is weeded out at every three values (product detection), and a signal 1 corresponding to the first pattern A, a signal 2 corresponding to the second pattern B, and a signal 3 corresponding to the third pattern R are obtained as shown in FIG. 6. However, width is not modulated in the third pattern R, and, moreover, maximum modulation width is 10 mm in the first pattern A and the second pattern B, while it is only 8 mm in the third pattern R. The signal 3 corresponding to the third pattern R has almost constant integration value, and it is about 80% of the value of the signal 1 or the signal 2.

The third pattern R, the first pattern A and the second pattern B are repeatedly disposed in a predetermined order. Thus, it is possible to determine which of the third pattern R, the first pattern A or the second pattern B is the signal which has been weeded out.

Further, in order to eliminate the influence of external light such as shade, signals (A–R) and (B–R) are obtained as shown FIG. 7 using the signal corresponding to the third pattern R as the reference.

Next, from the signals (A–R) and (B–R), a set of signals, i.e. R, (A–R) and (B–R), which include address position (m-th bit) of the linear sensor corresponding to horizontal position and include the reference signal, is selected. If the phases of (A–R) and (B–R) are obtained, it is possible to determine at which position of the leveling rod 1 the combination of the first pattern A, the second pattern B, and the third pattern R is located. As a result, approximate level height H2 at the horizontal position can be obtained (crude measurement).

AS described above, the level height H can be obtained as follows: Phase of the reference signal at horizontal position is obtained (precise measurement). Further, it is determined at which position the reference signal corresponding to horizontal position is located according to the pattern-starting position of the leveling rod 1 from the phase difference between the first pattern A and the second pattern B (crude measurement). By aligning and matching the horizontal position H1 obtained by precise measurement with the level height H2 obtained by crude measurement, the level height can be obtained.

Next, description will be given on a case of short distance measurement.

In case of the short distance measurement, much clear images of the first pattern A, the second pattern B, and the third pattern R can be obtained compared with the case where level height is obtained by product detection after Fourier transform in the long distance measurement. Thus, by directly measuring signal width and by determining which block it corresponds to, measurement of high precision can be achieved for short distance.

As described above, it has been practiced on an electronic level that a white/black pattern formed on a collimation surface of the leveling rod is received by the photodetection element and high or low position is detected by discriminating the pattern. In this respect, when the measurement is made at such place as a place with the tree shade in daylight, strong contrast between sunlight and the shade is overlapped on the pattern of the leveling rod, and it is often difficult to judge the pattern on the photodetection element.

SUMMARY OF THE INVENTION

It is an object of the present invention to provide an electronic level, in which it is possible to discriminate the pattern even when there is the shade on a pattern surface of the leveling rod of the electronic level.

The electronic level according to the present invention is an electronic level for converting a pattern on a leveling rod to be collimated by photoelectric conversion and for determining difference of elevation, wherein there is provided an irradiation device for irradiating auxiliary survey light to be projected to the leveling rod by pulsed irradiation. The electronic level according to the present invention provides an electronic level as described above, wherein the auxiliary survey light is irradiated in fan-like shape so that a range of the leveling rod to be collimated can be covered. Also, the present invention provides an electronic level as described above, wherein a semiconductor laser is provided as a light source for the irradiation device, and a light beam emitted from the semiconductor laser has a larger beam-spreading angle in vertical direction. Further, the present invention provides an electronic level, wherein there is provided a lens for adjusting the beam-spreading angle to suit visual field of a telescope. Also, the present invention provides an electronic level, wherein a photodetection element for receiving reflection light from the leveling rod is provided and a shutter is arranged on the photodetection element, and the shutter is driven in synchronization with the irradiation device. Further, the present invention provides an electronic level as described above, wherein a photodetection element for receiving reflection light from the leveling rod is provided and the photodetection element receives the light in synchronization with the pulsed irradiation. Also, the present invention provides an electronic level as described above, wherein a retroreflection sheet is attached on a surface with a pattern of the leveling rod under pulsed irradiation. Further, the present invention provides an electronic level as described above, wherein the retroreflection sheet is a colored reflection sheet. By irradiating the auxiliary survey light as pulsed light, influence of the shade on the reflection surface of the leveling rod can be eliminated. By limiting the reflection light entering the photodetection element using the electronic shutter, S/N ratio can be improved.

DETAILED DESCRIPTION OF THE PREFERRED EMBODIMENT

In the following, description will be given on an embodiment of the present invention referring to the attached drawings.

Figure 1:
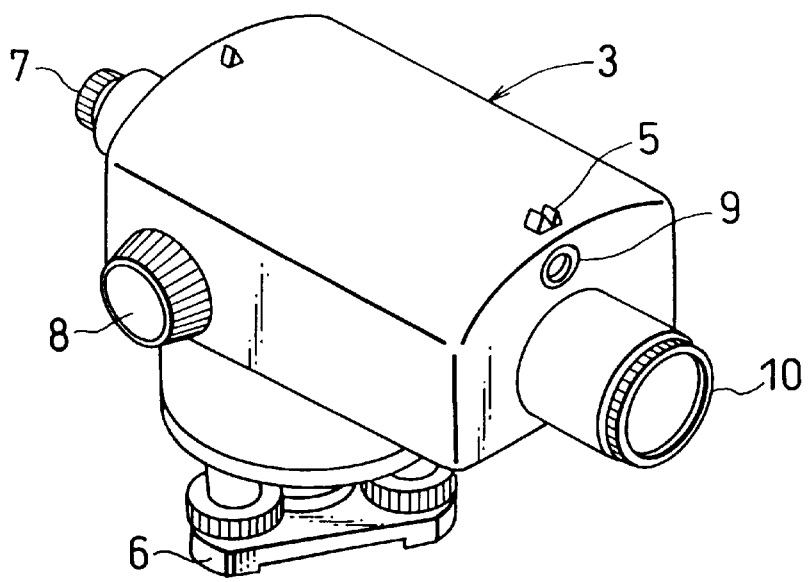
FIG. 1 shows an external view of a main unit of an electronic level according to the present invention.

FIG. 1 gives a general view of an electronic level. It comprises an electronic level main unit 3, a sighting device 5 for performing approximate alignment of a target point, a base unit 6 for supporting the electronic level main unit 3 and for performing leveling, an ocular lens unit 7 for collimating a leveling rod 1 for the electronic level positioned at the target point, a focusing knob 8 for performing collimation to the target point, a light projector 9 for projecting auxiliary survey light 11 toward the leveling rod 1 when necessary, an objective lens unit 10 of a telescope where a reflected light from the leveling rod 1 enters, and an operation unit 12 where a power switch and other components are arranged. A light source for emitting the auxiliary survey light 11 is automatically or manually operated, for example, when survey operation cannot be performed even though there is sufficient light amount.

Figure 2:
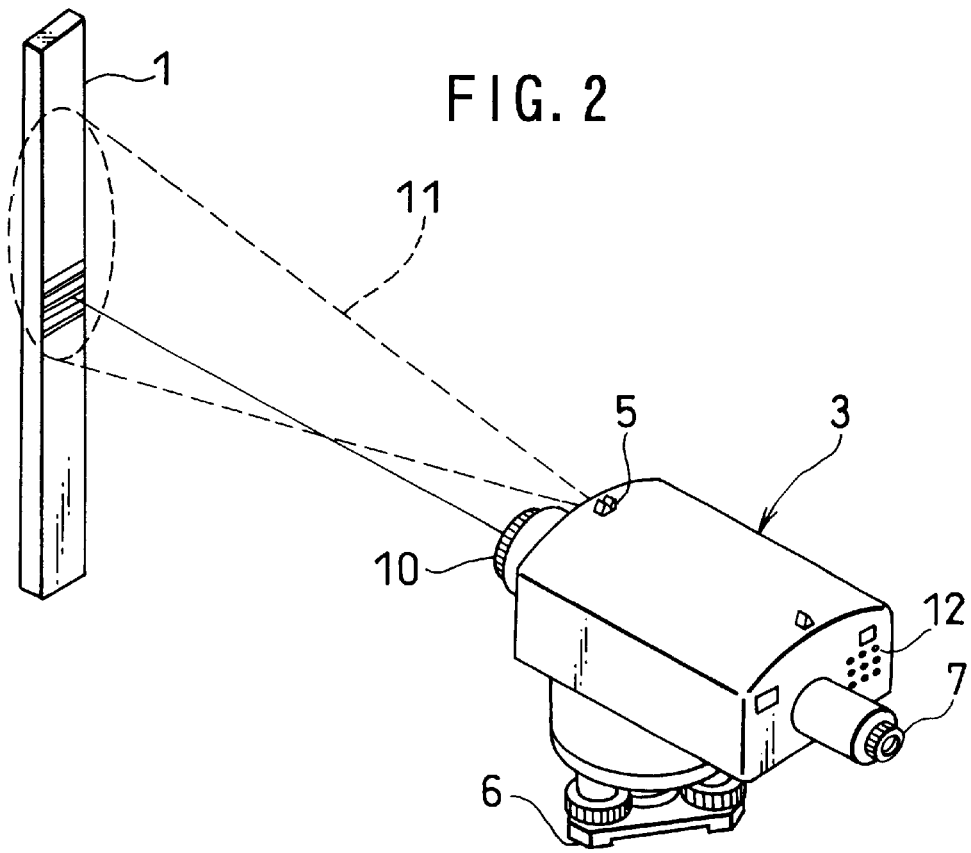
FIG. 2 is a drawing to explain measuring condition in an embodiment of the present invention.

FIG. 2 shows a condition where the auxiliary survey light 11 is projected toward the leveling rod 1 of the electronic level from the projector 9. The auxiliary survey light 11 is projected in vertically oblong elliptical shape so that a range can be covered on the collimated leveling rod of the telescope. If it is supposed that a visual field of the telescope is spread over an angle of about 1° 30' and a short distance measurement is to be made for a distance of 1 m and when the telescope and the projector 9 are disposed in parallel to each other, a spreading angle is required, which is spread over an angle of 5° horizontally and about 10° vertically. An spreading angle of a beam irradiated from a semiconductor element served as a light source is about 8° horizontally and about 30° vertically. Accordingly, the beam with larger spreading angle should be aligned with the vertical direction, and the spreading in vertical direction should be adjusted.

Figure 3:
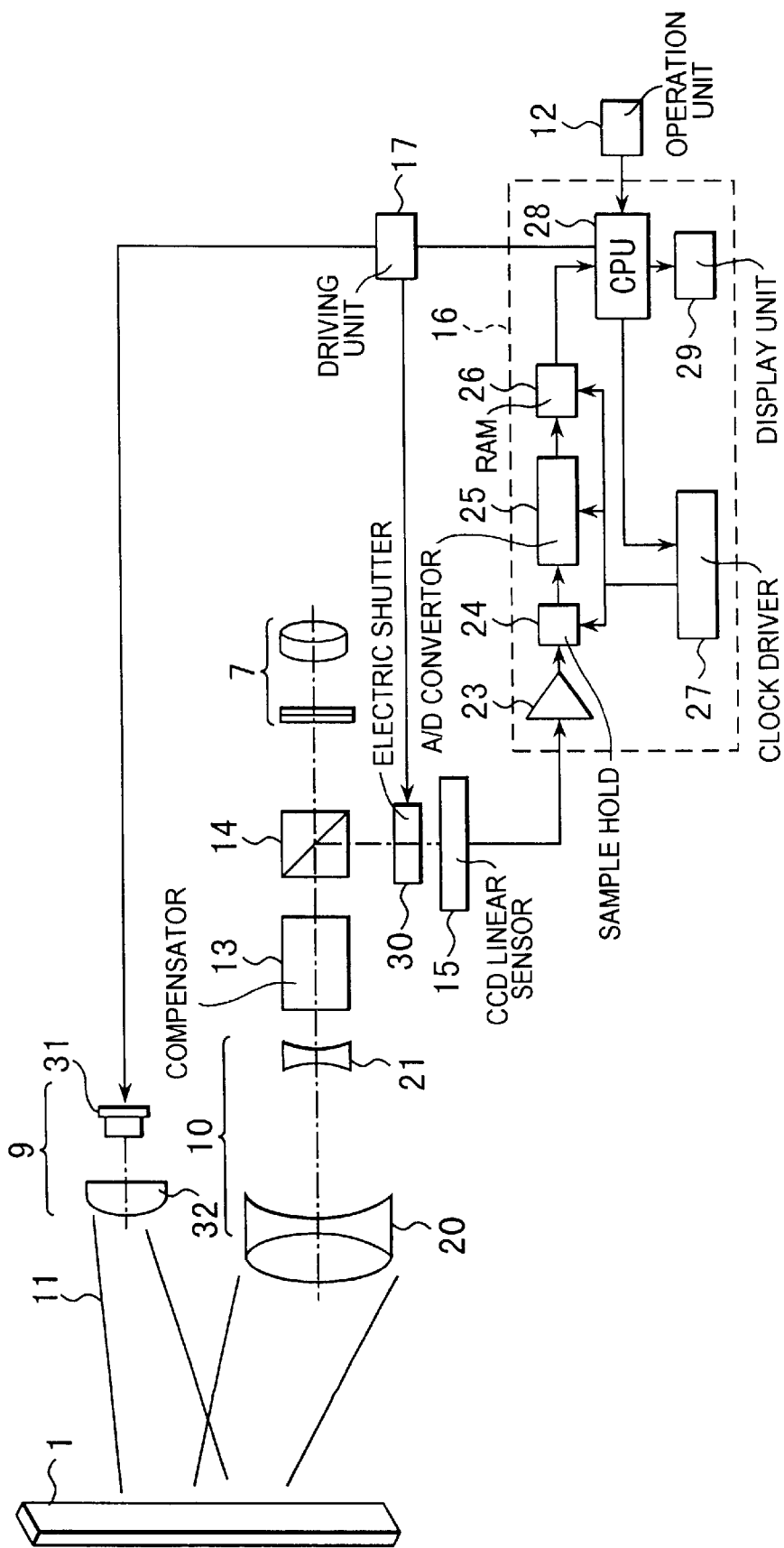
FIG. 3 is a block diagram showing an arrangement of an embodiment of the present invention.

Referring to FIG. 3, description will be given now on general arrangement of the electronic level main unit 3.

It comprises an objective lens unit 10, a compensator 13, a beam splitter 14, an ocular lens unit 7, a CCD linear sensor (photodetection element) 15, an arithmetic processing means 16, and a driving unit 17.

The objective lens unit 10 is used to form a pattern image of the leveling rod 1 of the electronic level. In the present embodiment, the objective lens unit 10 comprises an objective lens 20 and an internal lens 21. By moving the internal lens 21, the beam can be focused to the pattern image of the leveling rod 1. Therefore, the internal lens 21 corresponds to a focusing unit.

The compensator 13 is an automatic compensating mechanism for automatically adjusting the line of collimation in horizontal direction, even if the axis of the electronic level main unit 3 is inclined more or less and the image is formed by varying horizontal beam up or down. The beam splitter 14 splits the light beam in a direction toward the ocular lens unit 7 and in a direction of the CCD linear sensor 15.

The ocular lens unit 7 is used by a survey operator to visually observe the leveling rod 1. The CCD linear sensor 15 corresponds to a pattern detection unit, and it is used to convert the pattern image of the leveling rod 1 formed by the objective lens unit 10 to an electric signal.

In the present embodiment, the CCD linear sensor 15 is used. Any type of sensor can be adopted as the CCD linear sensor 15 so far as it is a linear image sensor where photodiodes are arranged at least uni-dimensionally.

The arithmetic processing means 16 comprises an amplifier 23, a sample-hold 24, an A/D converter 25, a RAM 26, a clock driver 27, a microcomputer 28, and a display unit 29.

The amplifier 23 is used to amplify the electric signal from the CCD linear sensor 15, and the sample-hold 24 is used for sample-holding the amplified electric signal using a timing signal from the clock driver 27. The A/D converter 25 is used for A/D conversion of the electric signal processed by the sample-hold. RAM 26 stores the digital signal obtained from A/D conversion. The microcomputer 28 is used for various arithmetic operations.

The projector 9 comprises a semiconductor laser 31 and a cylindrical lens 32. The semiconductor laser 31 is driven and controlled by the microcomputer 28 via the driving unit 17. The projector 9, the driving unit 17, the microcomputer 28, etc. constitute an irradiation device, which irradiates the auxiliary survey light 11 to the leveling rod 1 by pulsed irradiation.

As described above, in order to collimate by the telescope, the spreading angle of the auxiliary survey light 11 should be 5° horizontally and about 10° vertically. The spreading angle of the beam emitted from the semiconductor element served as the light source is about 8° horizontally and about 30° vertically. In this respect, the cylindrical lens 32 having power in vertical direction is disposed to adjust the vertical spreading angle of the auxiliary survey light 11.

With the spreading angle adjusted, the auxiliary light 11 is projected toward the leveling rod 1, but there is no need to project the light continuously. It will suffice if there is incident light amount enough to sense and detect for photodetection by the photodetection element, i.e. the CCD linear sensor 15. If the photodetection element is a CCD, the amount of incident light is a product of "electric charge accumulating time" and "illuminance of incident light". If the photodetection element is an LD with high output, pulsed radiance of several milliseconds will suffice.

Because the CCD linear sensor 15 is designed in such manner that it receives only visible range light and does not receive noise light, the semiconductor laser 31 is an LD closer to visible light, but no problem occurs if shorter light emission time is set. The CCD linear sensor 15 is so designed that it is synchronized with pulsed radiance and receives the light only at light emission. Further, in front of the CCD linear sensor 15, there may be provided an electric shutter 30, which is driven by the driving unit 17 and is opened or closed in synchronization with light emission of the semiconductor laser 31 in order to avoid the receiving of noise light.

Figure 4:
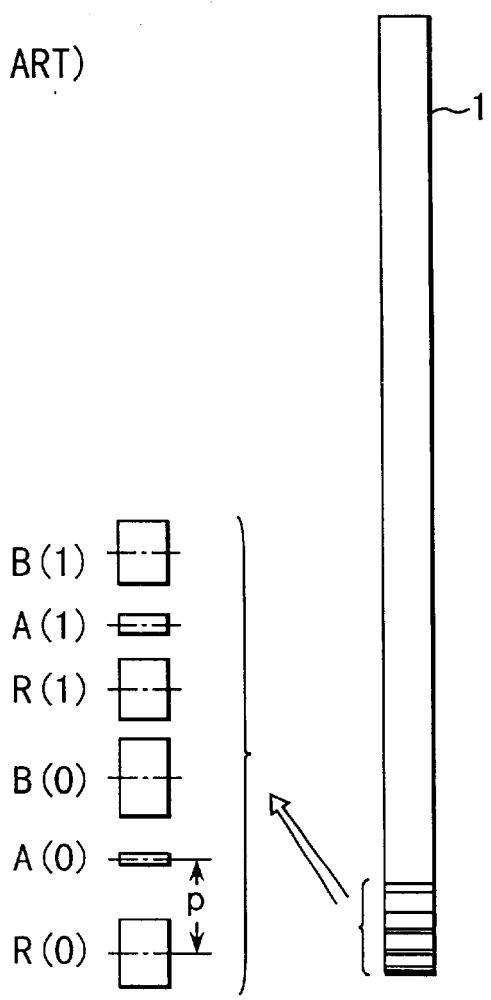
FIG. 4 is a drawing to explain a pattern on a leveling rod for the electric level.
Figure 5:
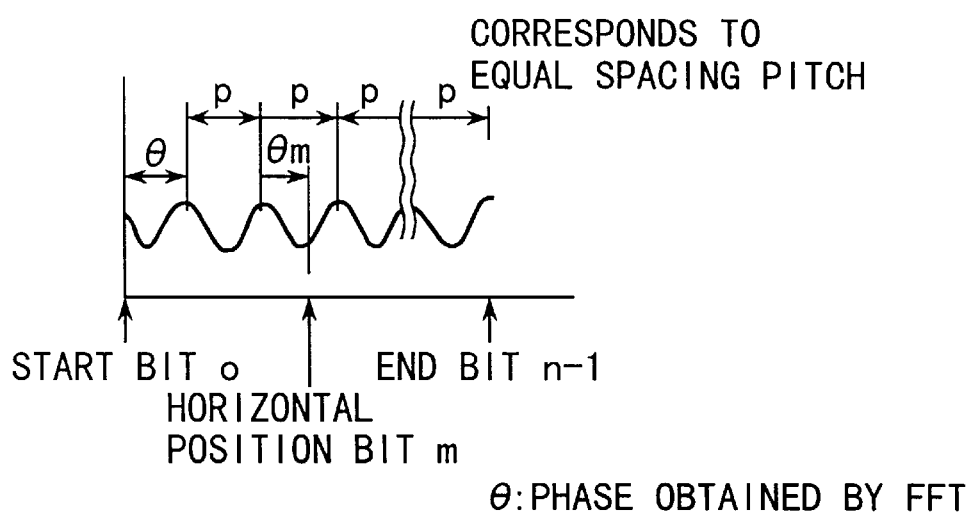
FIG. 5 shows a signal when a photodetection signal of a linear sensor has been processed by Fourier transform.
Figure 6:
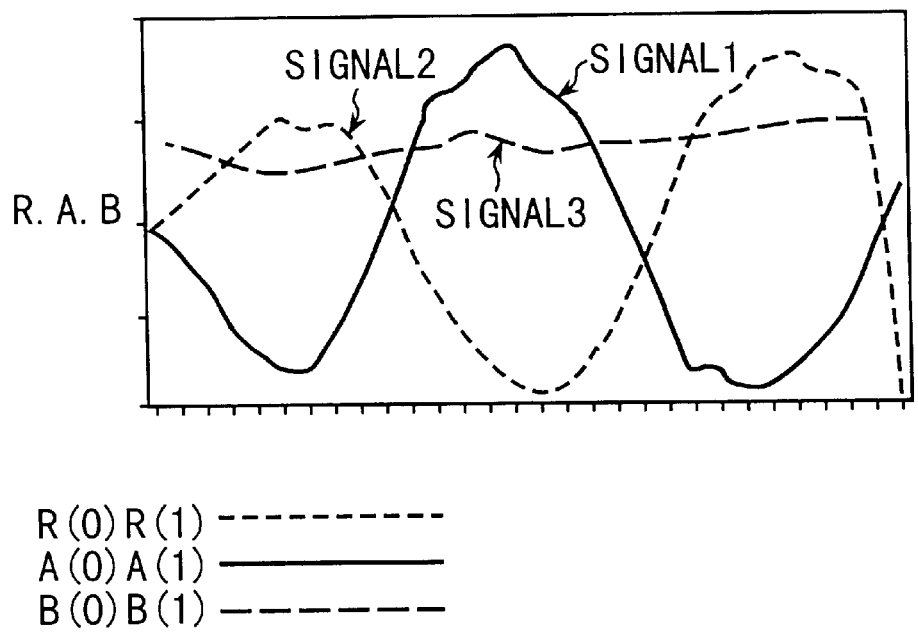
FIG. 6 shows a signal when the photodetection signal is separated for each pattern.
Figure 7:
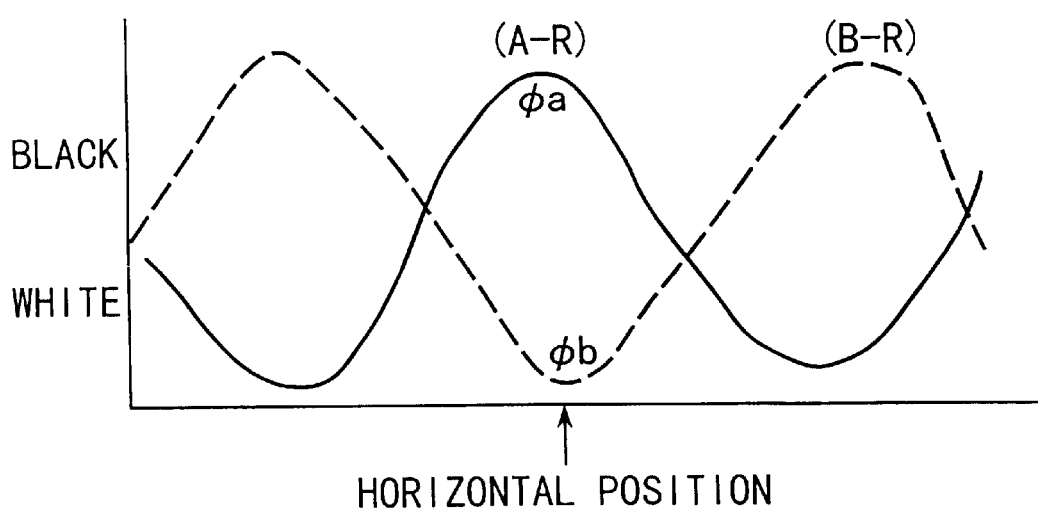
FIG. 7 shows a signal when influence of disturbance light is removed from the signal of FIG. 6.

On the surface where the pattern of the leveling rod 1 is formed, a retroreflection sheet for easier reflection is attached, and a pattern as shown in FIG. 4 is formed on the surface of the retroreflection sheet. The pattern formed on the retroreflection sheet can detect collimation light much easier than white-black pattern and it reflects the auxiliary survey light 11 much easier. Either the pattern or the plain ground may be designed as a retroreflection surface. Further, it may be designed in such manner that the normal retroreflection sheet looks gray while a colored retroreflection sheet may be used to further increase visibility of the pattern.

Now, description will be given on operation.

The microcomputer 28 operates the semiconductor laser 31 to emit pulsed radiance via the driving unit 17. Of the visible light and near infrared light laser beam emitted from the semiconductor laser 31, only vertical components are converged by the cylindrical lens 32, and a light beam in elliptical shape having a spreading angle of 10° vertically and about 8° horizontally is irradiated (See FIG. 2).

The laser beam emitted from the semiconductor laser 31 has such intensity that it is not influenced by factors such as the tree shade. Reflection light reflected by the leveling rod 1 is irradiated through the objective lens unit 10, and it is split into two beams, i.e. a beam directed toward the ocular lens 7 and a beam directed toward the CCD linear sensor 15, by the beam splitter 14. In front of the CCD linear sensor 15, the electric shutter 30 is arranged, and it is driven in synchronization with the semiconductor laser 31 and is opened only when the reflection light from the leveling rod 1 enters. As a result, incidence of external light is suppressed, and this leads to the increase of S/N ratio.

The reflection light enters through the electric shutter 30, and the pattern of the leveling rod 1 as described above is projected on the CCD linear sensor 15. The amplifier 23 amplifies the electric signal from the CCD linear sensor 15, and the sample-hold 24 performs sample-holding of the amplified electric signal using the timing signal from the clock driver 27. The A/D converter 25 converts the signal to the electric signal, which has been processed by the sample-hold, by A/D conversion. The RAM 26 is used to store the digital signal after the A/D conversion.

The microcomputer 28 calls a photodetection signal from the RAM 26. In case of long distance measurement, the signal from the photodetection element is processed by Fourier transform or product detection is performed. Further, phase of the reference signal at horizontal position is obtained (precise measurement). Or, from phase difference between a first pattern A and a second pattern B, it is determined at which position the reference signal corresponding to horizontal position is set according to the pattern-starting position of the leveling rod 1 (crude measurement). Then, arithmetic operation is carried out, such as alignment of the horizontal position H1 obtained by the precise measurement with the level height H2 obtained by crude measurement.

In case of short distance measurement, the microcomputer 28 directly measures signal width of each of the first pattern A, the second pattern B and a third pattern R, and performs arithmetic operation to determine which block it corresponds to.

According to the present invention, pulsed auxiliary survey light is projected to the leveling rod so that the influence of factors such as the tree shade can be eliminated in the measurement. This makes it possible to perform high precision measurement. Also, only required portion of the auxiliary survey light is irradiated by pulsed irradiation, and the system can be operated with low electric power. Further, the electronic shutter is driven in response to pulsed radiance, and this makes it possible to withhold and reduce incidence of external light and contributes to the improvement of S/N ratio.

What is claimed is:

1. An electronic level for converting to an electric signal a pattern surface on a leveling rod by photoelectric conversion and for determining elevation, wherein there is provided an irradiation device for irradiating auxiliary survey light by pulsed irradiation in order to eliminate shade on said pattern surface of said leveling rod, and said auxiliary survey light irradiates a field of view and said auxiliary survey light is irradiated in a fan-like shape corresponding to said field of view of said leveling rod.

2. An electronic level according to claim 1, wherein a semiconductor laser is provided as a light source for the irradiation device, and a light beam emitted from said semiconductor laser spreads both in a vertical direction and a horizontal direction and a beam-spreading angle in the vertical direction is larger than a beam-spreading angle in the horizontal direction.

3. An electronic level according to claim 1, wherein a photodetection element for receiving reflection light from said leveling rod is provided and a shutter which is synchronized with the pulsed irradiation is arranged on said photodetection element, wherein said shutter is driven in synchronization with said irradiation device and limits an incident light.

4. An electronic level according to claim 1, wherein a retroreflection sheet is attached on a surface of said leveling rod and is a colored reflection sheet.

* * * * *